Aug. 24, 1943.   J. W. JICHA   2,327,431
FISHING REEL
Filed Oct. 25, 1940

INVENTOR.
JOSEPH W. JICHA
BY Hull, West & Chilton
ATTORNEYS.

Patented Aug. 24, 1943

2,327,431

UNITED STATES PATENT OFFICE 2,327,431

FISHING REEL

Joseph W. Jicha, Cleveland, Ohio

Application October 25, 1940, Serial No. 362,763

9 Claims. (Cl. 242—84.1)

This invention relates to improvements in fishing reels. While it comprehends various forms and refinements as will hereinafter appear, the invention consists, essentially, of a semi-rounded or, in other words, a generally semi-spherical element that takes the place of or is applied to the rear plate of a fishing reel and is fully or approximately palm fitting.

In using a rod and reel in the customary way, a fisherman, after each cast, shifts the equipment to his left hand and holds it in that hand while reeling in the line with his right. The generally approved manner of holding the reel is to grasp it with the rear plate in the palm of the hand and with the index finger extended across the edge of the plate and engaged with the spool for controlling the line, this arrangement affording the user a sensitive feel or touch of the line's tautness and allowing quick release in the event of a strike. In the course of a day's fishing, the left hand becomes very tired and cramped through continual use in the manner above described, and the discomfort is increased by the relatively sharp edges of the rear plate and the usual protuberances thereon.

The main object of the invention is to promote comfort and afford a more secure hold on the reel by providing the semi-rounded element above referred to which constitutes an effective grip and fully supports the palm of the hand throughout its entire area, thereby avoiding fatigue and hand cramp; and, furthermore, this element disposes of or covers or coincides with the edges of the rear plate and protects the hand of the user from any protuberances usual on the rear end of reels.

Other objects are to provide constructions through which the foregoing desirable ends are attained and which are simple, inexpensive, and neat, and contribute to the attractive appearance of the fishing reel and impart to it a rather modern streamline effect.

An additional object is to provide a semi-rounded element as the rear member of a fishing reel structure that is characterized by a surface depression that merges into a peripheral notch and serves to comfortably receive and properly position the index finger of the left hand for the purpose hereinbefore pointed out.

The palm supporting element may be made of various materials, such as plastic, metal, wood, cork, or rubber of a greater or less degree of softness, and it may consist of a casting, stamping, turning or spinning; and, further, it may be in the form of a solid body or a hollow shell, as will more fully appear hereinafter.

Figures 1, 2:
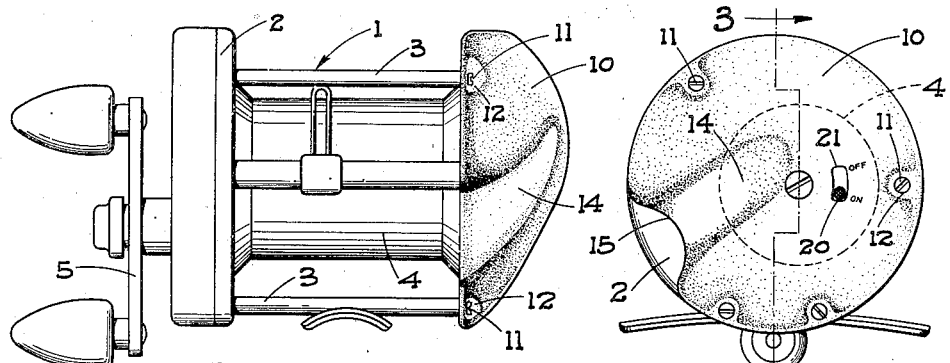
Figures 3, 4, 5:
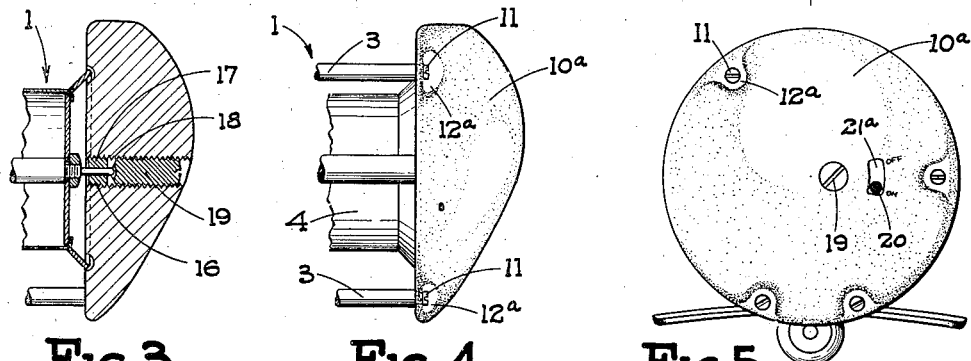

The objects above enumerated, with others that will be observed in the course of the following detailed description, are attained in the embodiments of the invention illustrated in the accompanying drawing wherein Fig. 1 is a side elevation, and Fig. 2 a rear end elevation, of a fishing reel incorporating the invention; Fig. 3 is a section on the line 3—3 of Fig. 2; Fig. 4 is a fragmentary side elevation of a reel embodying a modified form of the invention, and Fig. 5 is a rear end view thereof; while Figs. 6, 7, 8 and 9 are fragmentary elevational views with parts broken away showing forms of the invention in each of which the palm supporting element is a shell of the desired contour that is detachably or movably connected to the rear plate of the reel.

The fishing reel structure in which my improvements are incorporated or wherewith they are associated, and which is designated generally by the reference numeral 1, may, aside from my improvements, be of standard construction involving a front plate 2, pillars 3 and spool 4, the latter being adapted to be driven by the usual mechanism involving a crank 5.

According to the embodiment illustrated in Figs. 1 to 3, my invention consists of a fishing reel characterized by a rear element 10 constructed of any suitable material, such as those hereinbefore mentioned, and the same is shown as solid and as being attached to the pillars 3 by screws 11 that extend through holes in said element and the heads of which are accommodated by recesses 12 that open through the rounded face of the element. The element 10 is semi-rounded or generally semi-spherical, with its most elevated portion preferably somewhat eccentric, and it is desirably provided with a finger depression 14 that merges with a peripheral notch 15.

As will appear from Fig. 2, the spool 4 is mounted eccentrically of the element 10, as well as of the front plate 2, and the end of its shaft or spindle 16 is journaled in an externally threaded bushing 17 that occupies the inner end of a threaded bore 18 of the element 10 and the end of the shaft or spindle bears against the inner end of a plug 19 that is inserted into the bore 18 from the outer end thereof. The plug 19, at its inner end, may be provided with an inset jewel or hardened bearing for the end of the shaft or spindle. The customary click of the reel has an actuating button 20 that is shiftable within a slot 21 of the element 10, the outer face of the button reposing slightly within the slot so as to avoid contact of the button with the palm of the hand when the reel is held therein.

The form of the invention illustrated in Figs. 4 and 5 differs from that above described principally by the omission of the finger receiving depression 14 and notch 15. In the present case, the element is designated 10a and has recesses 12a for the accommodation of the heads of the screws 11 that connect the element 10a to the pillars 3. Also, the element is provided with a slot 21a for the button 20 of the click.

Figures 6, 7, 8, 9:
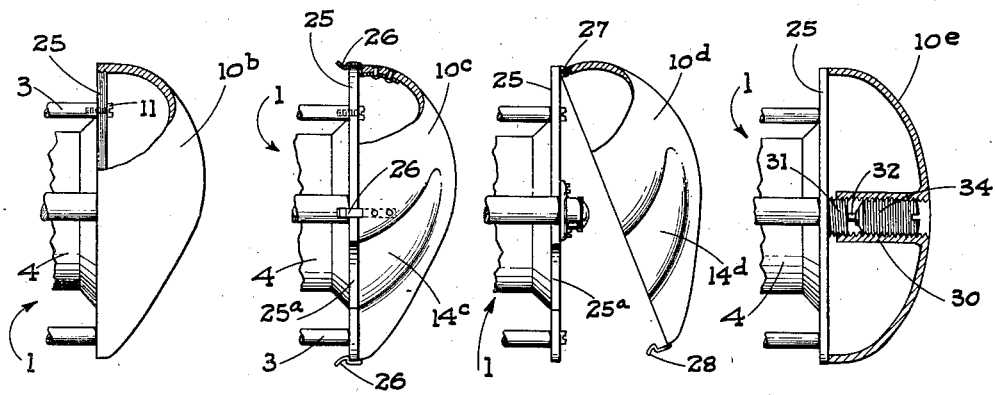

In Fig. 6, the rear element 10b of my invention is in the form of a shell whose open side is circular and internally threaded for the reception of the threaded periphery of an otherwise standard rear plate 25. In this form of the invention, the rear element may consist of a metal stamping or of a casting of metal or plastic, and in contour it may be of substantially the same shape as the form shown in Figs. 4 and 5. In the present case there are no openings or depressions in the member for the accommodation of the heads of screws 11, nor a bore for the bearing of the spool shaft or spindle, which bearing in this case is of usual form and carried by the rear plate 25. The element may, however, be provided with a slot for convenient access to the operating button of the click, as may also the forms yet to be described.

Fig. 7 shows a rear element 10c in the form of a shell that is adapted to be detachably connected to the rear plate 25 of the reel by spring latches or fingers 26; and Fig. 8 shows a similar element 10d that is hinged at 27 to the end plate 25. Adjacent its free edge, the element 10d has a spring latch 28 for holding engagement with the adjacent edge portion of the rear plate 25. Both of these forms of rear element may have the contour of the element 10 of the first described embodiment and, accordingly, are shown as provided with finger depressions 14c and 14d, respectively, that merge with notches 25a of the rear plates 25.

Fig. 9 shows a form of the invention in which the rear element 10e consists of a shell of suitable material that is approximately semi-spherical and has a central post 30 on its interior that is provided with a threaded bore for engagement over a threaded boss 31 that is carried by and is central of the rear plate 25 of the reel and in which boss the spool shaft or spindle 32 is journaled. In this case, a threaded plug 34, similar to previously described plug 19, may be screwed into the outer end of the bore of the post 30 for providing an adjustable thrust bearing for the end of the shaft or spindle 32. When the post is threaded onto the bearing 31, the periphery of the element 10e will coincide with the edge of the rear plate 25.

Where the terms "semi-rounded," or "generally semi-rounded" or "generally semi-spherical" are used, they are intended to designate a form that fits, or approximately fits, the palm of a cupped hand and is practically coextensive with the area thereof. This, I consider, the most essential feature of my invention.

Having thus described my invention, what I claim is:

1. In a fishing reel, a generally semi-rounded palm supporting element constituting the rear end of the reel and having its most elevated portion eccentric to its periphery.

2. In a fishing reel, a generally semi-rounded palm supporting element constituting the rear end of the reel and having a finger receiving depression.

3. In a fishing reel, a generally semi-rounded palm supporting element constituting the rear end of the reel and having a peripheral notch and a finger receiving depression in its outer side merging with said notch.

4. In a fishing reel, a rear plate, and a semi-rounded palm supporting element hingedly connected at one side to the plate and adapted to repose alongside the plate when in normal position, and latch means for holding the element in said position.

5. In a fishing reel, a rear plate, and a semi-rounded palm supporting element for application to the plate thereby to cover the same, the element having resilient holding means spaced about its periphery for engagement with the edge of the plate.

6. In a fishing reel, an end plate, and a semi-rounded palm supporting element applied to and coextensive with the outer side of said plate, the plate and element having registering peripheral notches, and the element being provided with a finger receiving depression that merges into the peripheral notch thereof.

7. In a fishing reel, a rear plate provided with an externally threaded boss that is located substantially central of the plate, and a semi-rounded palm supporting element whose axial dimension is not less than the length of said boss and that is adapted to be disposed over and cover the outer side of said plate with its rim in such close proximity to the edge portion of the plate as to leave no perceptible gap therebetween, the plate having no part projecting beyond the periphery of the element, and the outer surface of the element being devoid of any protuberance, said element being provided with a substantially central threaded bore for cooperation with the aforesaid boss for securing the element to said plate.

8. In a fishing reel, a rear plate provided with an externally threaded boss that is located substantially central of the plate, and a semi-rounded palm supporting element consisting of a shell having on its interior a substantially central post, said post being longer than the said boss but no greater in length than the axial dimension of said element, the post having an axial threaded bore for screw engagement with the aforesaid boss thereby to attach the element to said rear plate, the parts being so shaped and proportioned that the rim of the element is in such close proximity to the edge portion of the plate as to leave no perceptible gap therebetween, the plate having no part projecting beyond the periphery of the element, and the outer side of the element being devoid of any protuberance.

9. As a new article of manufacture, a semi-rounded palm supporting element adapted to be applied to and cover the rear plate of a fishing reel, the same having its most elevated portion eccentric to its periphery.

JOSEPH W. JICHA.